US012169985B1

(12) United States Patent
Gataric (10) Patent No.: US 12,169,985 B1
(45) Date of Patent: Dec. 17, 2024

(54) SYSTEMS AND METHODS FOR DETERMINING DIRECTION OF VEHICLE PATH THROUGH INTERSECTION

(71) Applicant: STATE FARM MUTUAL AUTOMOBILE INSURANCE COMPANY, Bloomington, IL (US)

(72) Inventor: Alexander Gataric, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 330 days.

(21) Appl. No.: 17/188,749

(22) Filed: Mar. 1, 2021

(51) Int. Cl.
*G07C 5/00* (2006.01)
*G06F 17/18* (2006.01)
(Continued)

(52) U.S. Cl.
CPC ............. *G07C 5/008* (2013.01); *G06F 17/18* (2013.01); *G06Q 40/08* (2013.01); *G08G 1/0112* (2013.01); *G08G 1/0129* (2013.01)

(58) Field of Classification Search
CPC ............ G07C 5/008; G07C 5/00; G07C 7/00; G08G 1/00; G01C 21/00; G01C 21/38–3896; G01C 21/28–32
See application file for complete search history.

(56) References Cited

U.S. PATENT DOCUMENTS 8,694,241 B1 * 4/2014 Kadous ................. G08G 1/0112
701/422
8,831,874 B1 * 9/2014 Pettis ................. G01C 21/3461
701/410
(Continued)

FOREIGN PATENT DOCUMENTS

CN 106564496 A 4/2017
CN 110162050 A 8/2019
(Continued)

OTHER PUBLICATIONS

Chen D, Yan X, Liu F, Liu X, Wang L, Zhang J. Evaluating and Diagnosing Road Intersection Operation Performance Using Floating Car Data. Sensors (Basel). May 15, 2019;19(10):2256. doi: 10.3390/s19102256. PMID: 31096714; PMCID: PMC6567343. (Year: 2019).*

(Continued)

*Primary Examiner* — Jess Whittington
*Assistant Examiner* — Paul Allen
(74) *Attorney, Agent, or Firm* — MARSHALL, GERSTEIN & BORUN LLP (57) ABSTRACT

Techniques for determining a direction that a vehicle turned through an intersection using vehicle telematics data associated with the vehicle are provided. A first simplified line representative of the vehicle trip may be generated using the telematics data and may be compared to a boundary of a region associated with the intersection to identify spatial data points and times associated with the vehicle's entrance to and exit from the region associated with the intersection. A second simplified line representative of the portion of the vehicle trip through the intersection may be generated based on the identified spatial data points and times, and the second simplified line may be substringed into two segments. Angles associated with the first (entrance) segment and second (exit) segment may be measured, and a direction associated with the vehicle's turn through the intersection during the vehicle trip may be identified based on the angles.

20 Claims, 5 Drawing Sheets

(51) Int. Cl.
*G06Q 40/08* (2012.01)
*G08G 1/01* (2006.01)

(56) References Cited

U.S. PATENT DOCUMENTS

| | | | |
|---|---|---|---|
| 9,311,271 | B2 | 4/2016 | Wright |
| 9,633,487 | B2 | 4/2017 | Wright |
| 9,666,066 | B2 | 5/2017 | Hiramatsu et al. |
| 9,751,506 | B2 | 9/2017 | Mudalige et al. |
| 9,830,748 | B2 | 11/2017 | Rosenbaum |
| 9,868,393 | B2 | 1/2018 | Bahgat et al. |
| 9,990,782 | B2 | 6/2018 | Rosenbaum |
| 10,192,369 | B2 | 1/2019 | Wright |
| 10,198,879 | B2 | 2/2019 | Wright |
| 10,269,190 | B2 | 4/2019 | Rosenbaum |
| 10,269,247 | B2 | 4/2019 | Ando |
| 10,467,824 | B2 | 11/2019 | Rosenbaum |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2011/0054783 | A1* | 3/2011 | Kishikawa ............... G06F 16/29 701/533 |
| 2015/0149080 | A1* | 5/2015 | McCarthy ........... G01C 21/3638 701/461 |
| 2017/0294036 | A1* | 10/2017 | Dorum .................. G06T 11/203 |
| 2019/0266629 | A1 | 8/2019 | Bax et al. |
| 2020/0103237 | A1* | 4/2020 | Ma ....................... G08G 1/0129 |
| 2020/0388156 | A1 | 12/2020 | Aoude et al. |
| 2021/0300410 | A1* | 9/2021 | Dorum ................... G08G 1/056 |
| 2021/0304462 | A1* | 9/2021 | Dorum ............... G01C 21/3819 |
| 2022/0092893 | A1 | 3/2022 | Rosenbaum |
| 2022/0340148 | A1 | 10/2022 | Rosenbaum |
| 2022/0412770 | A1* | 12/2022 | Li ....................... G01C 21/3841 |
| 2023/0060300 | A1 | 3/2023 | Rosenbaum |

FOREIGN PATENT DOCUMENTS

| | | |
|---|---|---|
| CN | 110298122 A | 10/2019 |
| CN | 110910636 A | 3/2020 |
| CN | 111583677 A | 8/2020 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| KR | 20180096463 A | 8/2018 |

OTHER PUBLICATIONS

PTAB decision, U.S. Appl. No. 14/800,767, mailed Feb. 23, 2021 (Year: 2021).*

PTAB decision, U.S. Appl. No. 14/735,002, filed Dec. 11, 2019 (Year: 2019).*

PTAB decision, U.S. Appl. No. 11/715,923, mailed Mar. 25, 2019 (Year: 2019).*

PTAB decision, U.S. Appl. No. 13/715,476, mailed Feb. 1, 2019 (Year: 2019).*

Quddus, M.A.; "High Integrity Map Matching Algorithms for Advanced Transport Telematics Applications;" Doctoral dissertation, Imperial College London, Jan. 2006, pp. 1-258.

Sun, Q. et al.; "Assessing drivers' visual-motor coordination using eye tracking, GNSS and GIS: a spatial turn in driving psychology;" *Journal of spatial science*, 61(2), 2016, pp. 299-316.

Wang, Y. et al.; "Driver Identification Leveraging Single-turn Behaviors via Mobile Devices;" *29th International Conference on Computer Communications and Networks (ICCCN)*; Aug. 2020; (pp. 1-9).

Brunsdon C.; "Path Estimation from GPS Tracks;" *Department of Geography, University of Leicester*, Jan. 2007 (pp. 1-9).

* cited by examiner

SYSTEMS AND METHODS FOR DETERMINING DIRECTION OF VEHICLE PATH THROUGH INTERSECTION

FIELD OF THE DISCLOSURE

The present disclosure generally relates to vehicle telematics and, more particularly, to determining a direction that a particular vehicle turned through a given intersection using vehicle telematics data associated with the particular vehicle.

BACKGROUND

Telematics is a method of monitoring a vehicle. By combining a location determination system (e.g., the global positioning system (GPS)) data with on-board monitoring data, it is possible to record and map where a vehicle is located, how fast the vehicle is traveling or a rate of acceleration associated with the vehicle, how the vehicle is being driven (e.g., directly, based on indications of driver operation such as application of brake or gas pedals, or indirectly, e.g., high acceleration values may correlate to poor driving behavior), and, in some examples, cross reference that information with how the vehicle is operating internally.

Currently, it may be difficult to determine whether a vehicle turned through a given intersection, as well as which direction the vehicle turned through the intersection, based on vehicle telematics data alone. For instance, vehicles' paths as they turn through different intersections, as well as vehicles' paths as they make different turns through the same intersection, may have very different shapes due to factors such as the number of roads that cross at the intersection, the number of lanes of each road that crosses at the intersection, the fact that one or more roads that cross at the intersection may be one-way roads, the speed limits associated with the one or more roads that cross at the intersection, the elevations of the one or more roads that cross at the intersection, and many other factors. However, this detailed information about various intersections may be difficult to obtain or difficult to access. Moreover, it may be difficult to distinguish between the path of a vehicle that is making a turn through an intersection compared to the path of a vehicle that makes a U-turn (i.e., never actually turns through the intersection), or the path of a vehicle that turns into a parking lot prior to the intersection.

SUMMARY

In one aspect, a computer-implemented method is provided, the method comprising: obtaining, by a processor, telematics data associated with a vehicle trip; generating, by the processor, a first simplified line representative of the vehicle trip based on the telematics data associated with the vehicle trip; obtaining, by the processor, spatial data representative of a boundary of a region associated with a particular traffic intersection; identifying, by the processor, a first spatial data point on the first simplified line associated with an entrance of the vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection; comparing, by the processor, the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection; generating, by the processor, a second simplified line representative of the portion of the vehicle trip through the intersection based on the first time and the second time; segmenting, by the processor, the second simplified line into an entrance segment and an exit segment; measuring, by the processor, a first angle in the range of 0 to 360 associated with the entrance segment, and a second angle in the range of 0 to 360 associated with the exit segment; and determining, by the processor, a direction associated with a turn through the intersection during the vehicle trip based on the first angle and the second angle.

In another aspect, a non-transitory computer-readable storage medium is provided, comprising instructions that, when executed, cause a machine to: obtain telematics data associated with a vehicle trip; generate a first simplified line representative of the vehicle trip based on the telematics data associated with the vehicle trip; obtain spatial data representative of a boundary of a region associated with a particular traffic intersection; identify a first spatial data point on the first simplified line associated with an entrance of the vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection; compare the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection; generate a second simplified line representative of the portion of the vehicle trip through the intersection based on the first time and the second time; segment the second simplified line into an entrance segment and an exit segment; measure a first angle in the range of 0 to 360 associated with the entrance segment, and a second angle in the range of 0 to 360 associated with the exit segment; and determine a direction associated with a turn through the intersection during the vehicle trip based on the first angle and the second angle.

In still another aspect, a computing device is provided, comprising a processor and a memory storing instructions that, when executed by the processor, cause the processor to: obtain telematics data associated with a vehicle trip; generate a first simplified line representative of the vehicle trip based on the telematics data associated with the vehicle trip; obtain spatial data representative of a boundary of a region associated with a particular traffic intersection; identify a first spatial data point on the first simplified line associated with an entrance of the vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection; compare the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection; generate a second simplified line representative of the portion of the vehicle trip through the intersection based on the first time and the second time; segment the second simplified line into an entrance segment and an exit segment; measure a first angle in the range of 0 to 360 associated with entrance segment, and a second angle in the range of 0 to 360 associated with the exit segment; and determine a direction associated with a turn through the intersection during the vehicle trip based on the first angle and the second angle.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The present application provides techniques for determining a direction that a particular vehicle turned during a trip through an intersection. Advantageously, the techniques provided herein do not require the use of external road data or map data (i.e., detailing the intricacies of various intersections) in order to make this determination.

A simplified line may be generated using telematics data from the vehicle's trip. A shape (e.g., box, circle, etc.) representing the general area or region of the intersection is applied to the simplified line to "cut" the line where the vehicle enters and exits the intersection. The spatial points where the "cut" occurs are used to determine the times at which the vehicle entered and exited the intersection. That is, the time associated with the first cut chronologically is the time at which the vehicle entered the general area of the intersection, and the time associated with the second cut chronologically is the time at which the vehicle exited the general area of the intersection. A new simplified line may then be generated using the time-ordered raw telematics data associated with the time period from the entrance time to the exit time. This new simplified line may then be substringed into two segments: an entrance segment is created as a line from the start of the line within the "cut" to the point that is 30% of the linear fraction of the length of the line within the "cut," and an exit segment is created as a line from the 70% fraction of the length of the line within the "cut" to the end of the line within the "cut.". An angle measurement from 0 to 360 is then determined for both the entrance segment and the exit segment. The direction of the vehicle's turn through the intersection may then be determined based on these two angle measurements.

Once the direction of the particular vehicle's turn is determined, the simplified line for the particular vehicle's turn may be compared to a spatial average vehicle path for that turn direction through the intersection to determine if there are any discrepancies or deviations between the particular vehicle's spatial path through the turn and the average spatial path through the turn. For instance, in some examples, a discrepancy or deviation may indicate that the vehicle did not actually turn through the intersection. For example, the vehicle may have made a U-turn, or may have turned into a parking lot near the intersection. Moreover, in some examples, a discrepancy or deviation may indicate that the vehicle may be driving unsafely or erratically through the intersection.

Advantageously, compared to conventional methods, which require defined roads in order to determine anything about a vehicle's turn through an intersection, the techniques provided herein derive road data using only driving data within a defined box-shaped intersection, remove outliers, and create a refined definition. That is, the techniques provided herein do not rely on pre-defined road data from external sources, which may be out of date or otherwise inaccurate, or expensive to obtain. Instead, the techniques provided herein derive the shape of the road based on the driving data from actual vehicles that drive through the intersection. Moreover, compared to conventional methods, the techniques provided herein require fewer steps and are thus performed more quickly by processors, saving both time and processing power compared to conventional methods.

Figure 1:
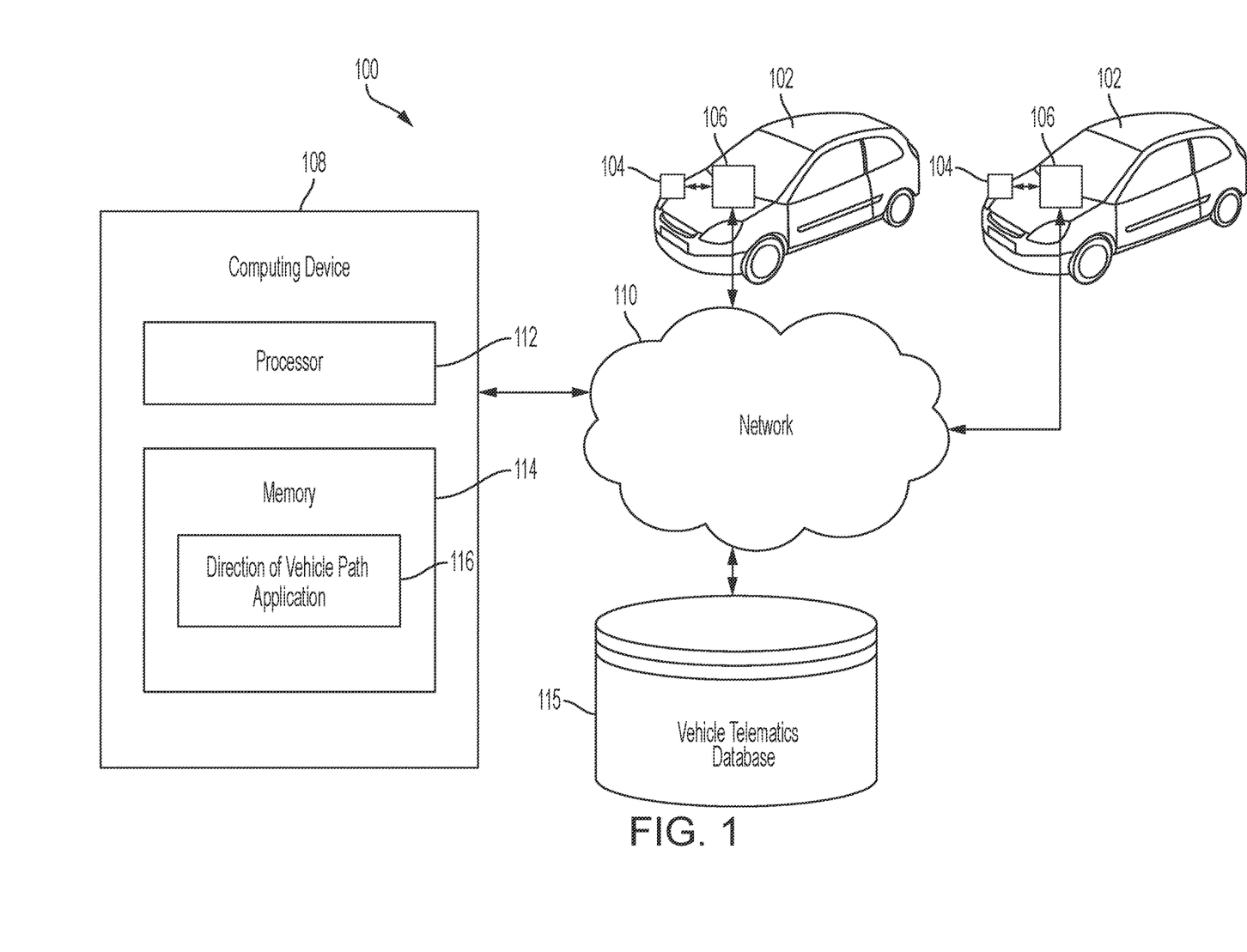
FIG. 1 illustrates a block diagram of an example system for determining a direction that a particular vehicle turned through a given intersection, in accordance with some embodiments.

FIG. 1 illustrates a block diagram of an example system 100 for determining a direction that a particular vehicle turned through a given intersection, in accordance with some embodiments. The high-level architecture illustrated in FIG. 1 may include both hardware and software applications, as well as various data communications channels for communicating data between the various hardware and software components, as is described below.

The system 100 may include a plurality of vehicles 102, each equipped with various sensors 104. The sensors 104 of each vehicle 102 may communicate, via a wired or wireless connection, with respective vehicle computing devices 106. In some examples, the vehicle computing devices 106 may be on-board computing devices. The vehicle computing devices 106 may communicate with another computing device 108, e.g., via signals sent over a network 110. For instance, the vehicle computing devices 106 may send telematics data or other measurements captured by the sensors 104 to the computing device 108 via the network 110.

The sensors 104 may include location sensors (e.g., GPS) and motion sensors (e.g., accelerometers, gyrometers, etc.) and other suitable vehicle telematics sensors configured to capture indications of the motion and operation of the respective vehicles 102 over time, as well as a clock function configured to timestamp various sensor readings and vehicle telematics data captured by the sensors 104.

Figure 2A:
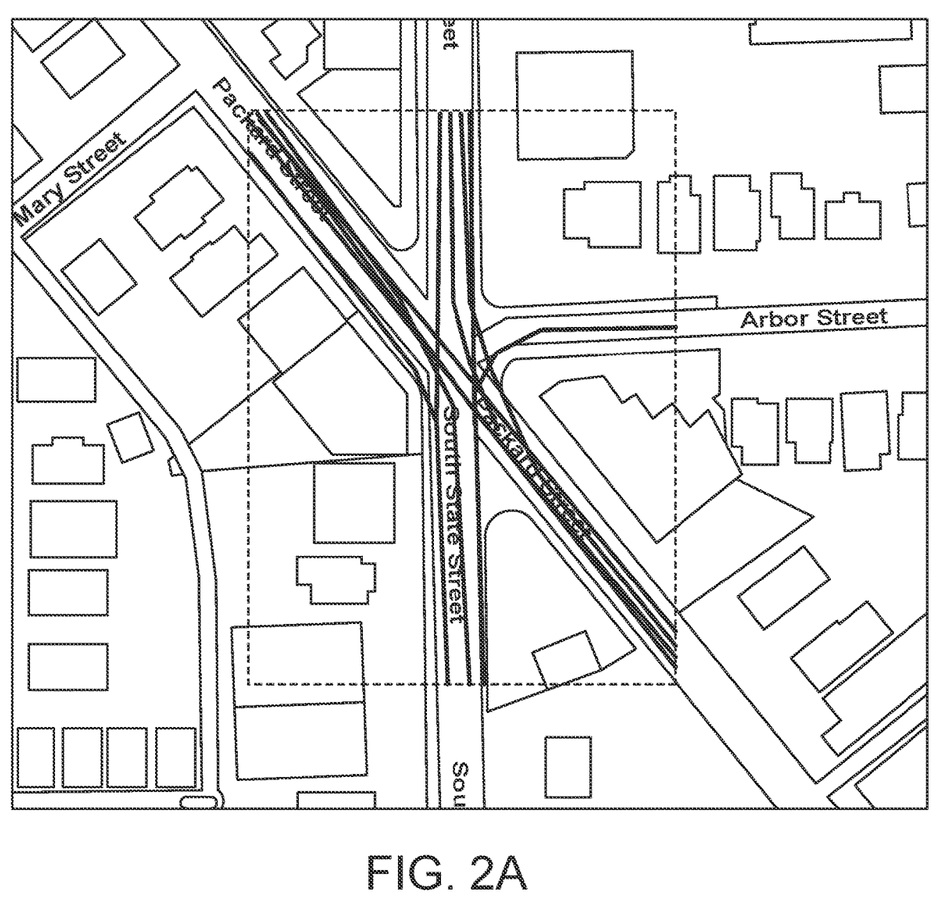
FIGS. 2A-2C illustrate diagrams of example steps for determining a direction that a particular vehicle turned through a given intersection, in accordance with some embodiments.

The computing device 108 may include one or more processors 112 and a memory 114. The one or more processors 112 may interact with the memory 114 to obtain, for example, computer-readable instructions stored in the memory 114. The computer-readable instructions stored in the memory 114 may cause the one or more processors 112 to store telematics data sent by the vehicle computing device 106 in a vehicle telematics database 115, to access telematics data from the vehicle telematics database 115, and/or to execute one or more applications, such as a direction of vehicle path application 116. Generally speaking, the direction of vehicle path application 116 may be used to determine which direction a vehicle turned through a particular intersection. For instance, FIG. 2A illustrates a rendering of a large number of possible turns through a particular intersection. The direction of vehicle path application 116 may be used to determine which of the many possible turns a particular vehicle made during a particular vehicle trip.

Figure 2B:
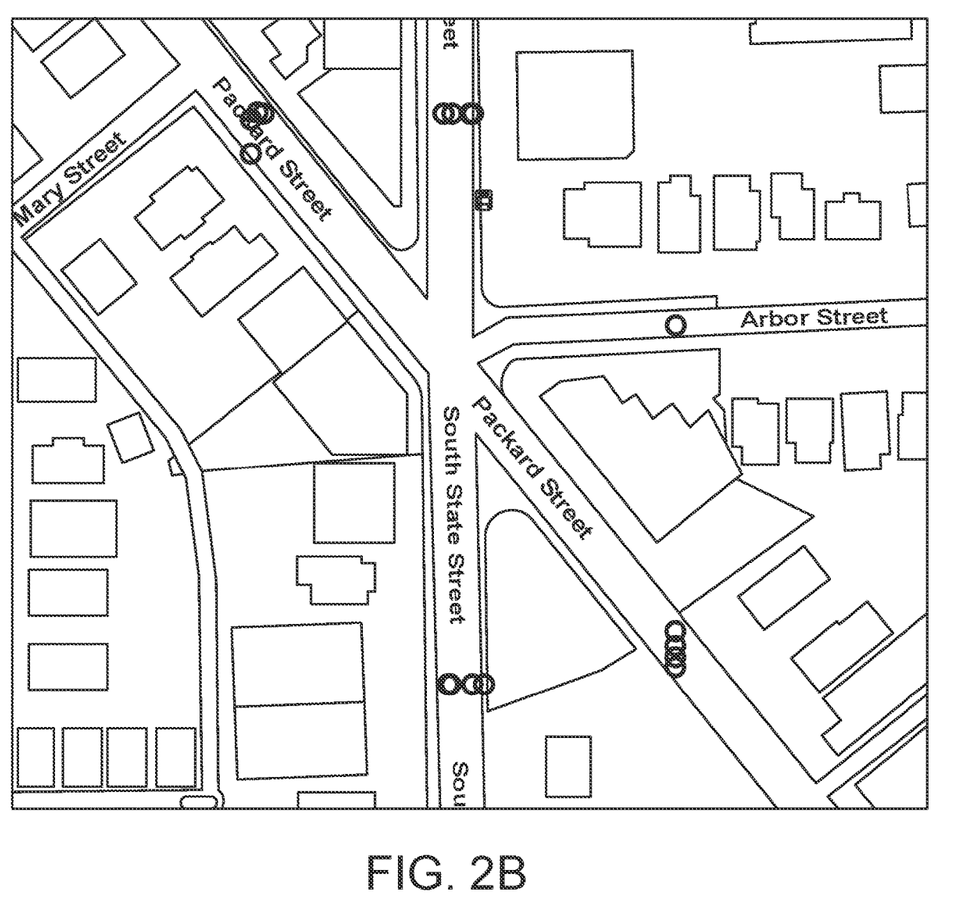

Executing the direction of vehicle path application 116 may include obtaining telematics data associated with a particular vehicle trip made by a particular vehicle 102. For instance, executing the direction of vehicle path application 116 may include obtaining telematics data from the vehicle telematics database 115 associated with a particular vehicle trip made by a particular vehicle 102. The vehicle telematics data may include a series of spatial data points for the vehicle trip made by the vehicle 102. Executing the direction of vehicle path application 116 may further include generating a simplified line representative of the vehicle trip, and obtaining spatial data representative of a boundary associated with a particular intersection. Moreover, executing the direction of vehicle path application 116 may include comparing the boundary associated with the particular intersection to the simplified line to determine where the simplified line crosses (i.e., intersects with) the boundary. Additionally, executing the direction of vehicle path application 116 may include identifying the spatial data points where the simplified line intersects with the boundary of the intersection an entrance point and an exit point, respectively, indicating where the vehicle entered and exited the intersection. For instance, FIG. 2B illustrates a rendering of example entrance and exit points for the various vehicle turns through the intersection shown at FIG. 2A.

Figure 2C:
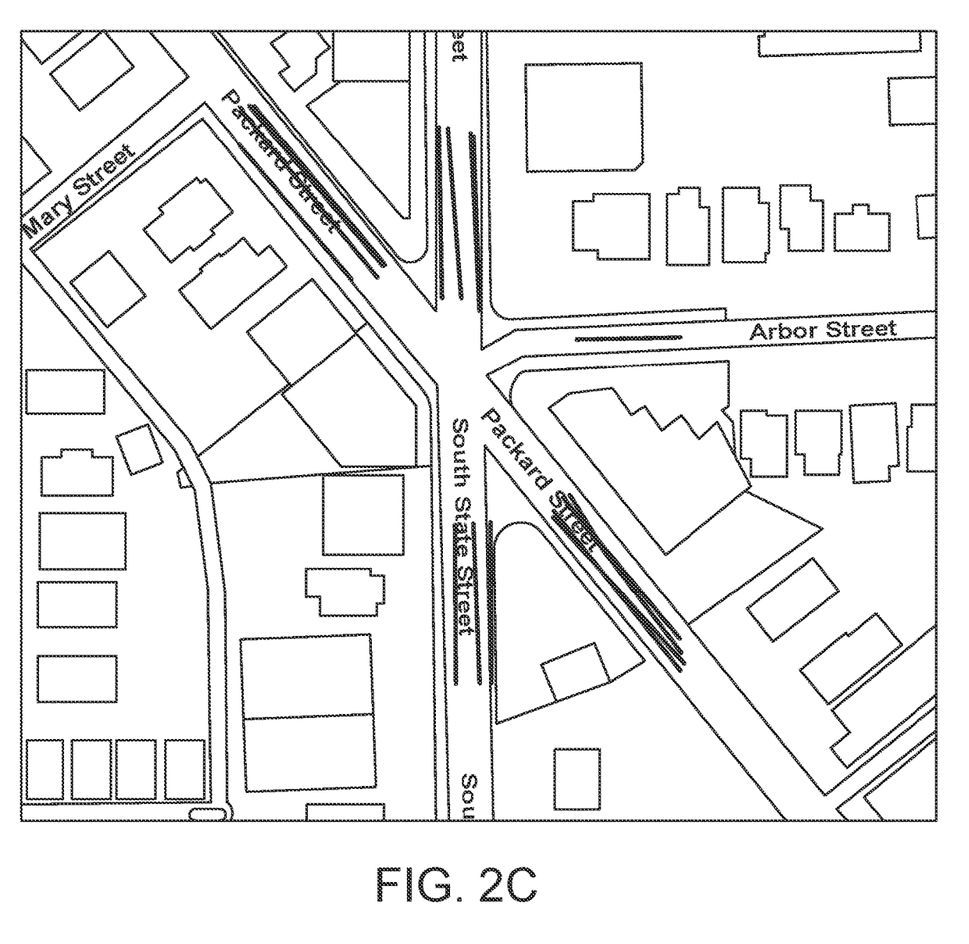

Furthermore, executing the direction of vehicle path application 116 may include determining the times associated with the entrance point and the exit point. Accordingly, executing the direction of vehicle path application 116 may include generating a second simplified line representative of the portion of the vehicle trip through the intersection, i.e., cutting off the original simplified line at the entrance and exit points. Executing the direction of vehicle path application 116 may further include segmenting the simplified line representative of the portion of the vehicle trip through the intersection. Additionally, executing the direction of vehicle path application 116 may include measuring a first angle in a range of 0 to 360 associated with the first segment (i.e., the entrance segment) and measuring a second angle in the range of 0 to 360 associated with the second segment (i.e., the exit segment). For instance, FIG. 2C illustrates a rendering of example entrance and exit segments for the various vehicle turns through the intersection shown at FIG. 2A. Executing the direction of vehicle path application 116 may determining the direction of the vehicle's turn through the intersection during the vehicle trip based on the angle associated with the entrance segment and the angle associated with the exit segment.

In some examples, executing the direction of vehicle path application 116 may further include comparing simplified line representative of the portion of the vehicle trip through the intersection to a spatial average path of turns associated with the same direction through the intersection made during a plurality of other vehicle trips by a respective plurality of other vehicles 102. For instance, executing the direction of vehicle path application 116 may include determining a measure of the difference between the simplified line representative of the portion of the vehicle trip through the intersection and the spatial average path of turns associated with the same direction through the intersection made during the plurality of other vehicle trips by the respective plurality of other vehicles.

In some examples, calculating this measure of difference includes calculating a Hausdorff distance or a Fréchet distance between the two lines. Generally speaking, a Hausdorff distance, or Hausdorff metric, also called Pompeiu-Hausdorff distance, measures how far two subsets of a metric space are from each other, and a Fréchet distance is a measure of similarity between curves that takes into account the location and ordering of the points along the curves.

Moreover, in some examples, calculating this measure of difference includes dividing the simplified line representative of the portion of the vehicle trip through the intersection into a number of segments, and dividing the average simplified line into the same number of segments, and comparing each segment of each of the simplified line representative of the portion of the vehicle trip through the intersection to the corresponding segment of the spatial average through the turn of the intersection. For instance, the distance of each node of the simplified line representative of the portion of the vehicle trip through the intersection may be compared to the corresponding node of the average spatial path through the turn of the intersection, and minimum, maximum, and average distances between each of the nodes from the simplified line representative of the portion of the vehicle trip through the intersection and the corresponding node of the average spatial path through the turn of the intersection. Similarly, the angles (e.g., 0-360) of each segment of the simplified line representative of the portion of the vehicle trip through the intersection may be compared to the angle of the corresponding segment of the average spatial path through the intersection to determine a difference in angles, and minimum, maximum, and average differences in angles between each of the segments of the simplified line representative of the portion of the vehicle trip through the intersection and the corresponding segment of the average spatial path through the intersection may be determined.

In some examples, executing the direction of vehicle path application 116 may include determining an indication of any unsafe driving behaviors associated with the portion of the vehicle trip through the intersection. For instance, if the vehicle's path through the intersection varies in some ways from the average path of other vehicles that made the same turn through the intersection (e.g., as determined based on the measure of difference discussed above), this may indicate that the vehicle was driven through the intersection in an unsafe or otherwise spatially deviant manner.

Moreover, in some examples, executing the direction of vehicle path application 116 may include determining whether instances in which the vehicle did not actually make a turn through the intersection. For instance, if the vehicle's path through the intersection varies significantly from the average path of other vehicles that made the turns through the intersection (based on measurement of difference), in some cases the vehicle's path through the intersection should not be categorized as a turn through the intersection. For example, the portion of the vehicle trip through the region of the intersection that is vastly different than the average turn through the intersection in the same direction may be more properly categorized as a U-turn or as a parking lot turn.

Furthermore, in some examples, the computer-readable instructions stored on the memory 114 may include instructions for carrying out any of the steps of the method 300, described in greater detail below with respect to FIG. 3.

Figure 3:
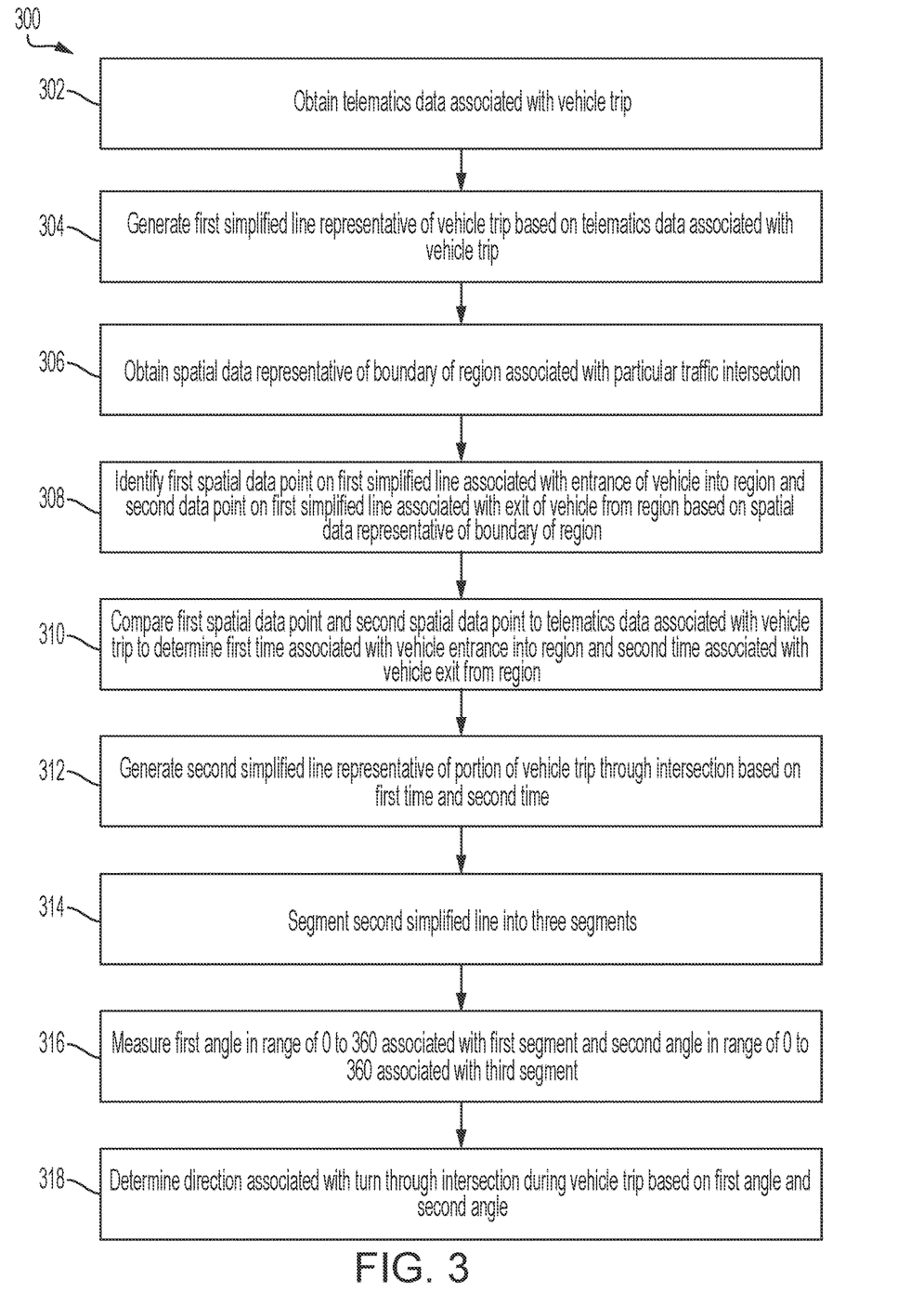
FIG. 3 illustrates a flow diagram of an example method for determining a direction that a particular vehicle turned through a given intersection, in accordance with some embodiments.

FIG. 3 illustrates a flow diagram of an example method 300 for determining a direction that a particular vehicle turned through a given intersection, in accordance with some embodiments. One or more steps of the method 300 may be implemented as a set of instructions stored on a computer-readable memory 114 and executable on one or more processors 112.

The method may begin when telematics data associated with a vehicle trip made by a particular vehicle is obtained (block 302). The telematics data may include a plurality of spatial data points associated with the vehicle trip. Each spatial data point may indicate a vehicle position (e.g., GPS coordinates) and an associated time that the vehicle was at that position. In some examples, other telematics data (such as, e.g., speed data, acceleration data, braking data, or other vehicle sensor data) may also be associated with each spatial data point.

A first simplified line representative of the vehicle trip may be generated (block 304) based on the telematics data associated with the vehicle trip. For instance, the simplified line may be a path from each spatial data point to the next, in chronological order, or may be a smoothed or otherwise simplified version of the path from each spatial data point to the next in chronological order.

Spatial data representative of a boundary of a region associated with a particular traffic intersection may be obtained (block 306). For instance, the boundary may be a circle, square, or other shape with a spatial data point associated with the particular traffic intersection as its center.

A first spatial data point on the first simplified line associated with an entrance of the vehicle into the region associated with the particular traffic intersection and a second spatial data point on the first simplified line associated with an exit of the vehicle from the region associated with the particular traffic intersection may be identified (block 308) based on intersections between the first simplified line representative of the vehicle trip and the boundary of the region associated with the particular traffic intersection. That is, the boundary of the region associated with the traffic intersection may function as a "cookie cutter" that intersects the first simplified line at the spatial data points where the vehicle enters and exits the region of the intersection.

The first spatial data point and the second spatial data point may be compared (block 310) to the telematics data associated with the vehicle trip to determine a first time associated with the entrance of the vehicle into the region associated with the particular traffic intersection and a second time associated with the exit of the vehicle from the region associated with the particular traffic intersection. That is, the times associated with the entrance and exit points identified at block 308, indicating the times at which the vehicle entered and exited the traffic intersection, may be identified.

A second simplified line representative of the portion of the vehicle trip through the intersection may be generated (block 312) based on the first time and the second time. For instance, the second simplified line may be generated using the spatial data points from the first time to the second time. For instance, the second simplified line may be a path from each spatial data point to the next, in chronological order, or may be a smoothed or otherwise simplified version of the path from each spatial data point to the next in chronological order.

The second simplified line may be substringed (block 314) into two segments. An entrance segment is created as a line from the start of the line within the "cut" to the point that is 30% of the linear fraction of the length of the line within the "cut," and an exit segment is created as a line from the 70% fraction of the length of the line within the "cut" to the end of the line within the "cut.". Generally speaking, the entrance and exit segments may be straight, i.e., representative of the vehicle's entrance into and exit from the intersection, respectively.

A first angle in the range of 0 to 360 associated with the entrance segment, and a second angle in the range of 0 to 360 associated with the exit segment, may be measured (block 316). For instance, the first angle may be an angle measurement from the center of the intersection to the first segment, and the second angle may be an angle measurement from the center of the intersection to the second segment. For instance, an angle of 0 may be a line in the North direction, while an angle of 90 may be a line in the East direction, and an angle of 180 may be a line in the South direction, while an angle of 270 may be a line in the West direction.

A direction associated with a turn through the intersection during the vehicle trip may then be determined (block 318) based on the first angle and the second angle. Generally speaking, the first angle may an angle representing the vehicle's entrance into the intersection, and the second angle may be an angle representing the vehicle's exit from the intersection. The vehicle's entrance angle and exit angle may be compared to respective entrance angles, or ranges of entrance angles, and exit angles, or ranges of exit angles, for each possible turn through the intersection to determine which turn was made by the vehicle.

For instance, entrance/exit points for a plurality of other vehicles' trips through the intersection in various directions (e.g., as shown at FIG. 2B) may be used to generate a range of angles associated with each entrance road and each exit road of the intersection. For example, entrance points and exit points generated using telematics data from a plurality of vehicle turns through the intersection may averaged for each possible entrance into and exit from the intersection. For instance, referring to FIG. 2B, an angle, from 0-360, from the average entrance point to the center of the intersection, when entering the intersection via South State Street, going North, may be calculated, and an "entrance range" may be determined based on the calculated angle. For instance, if the calculated angle of entrance when entering the intersection via South State Street is 180, the entrance range for that particular entrance may be a range of 175-185 degrees (e.g., plus or minus five degrees from the entrance angle), or 170-190 degrees (e.g., plus or minus ten degrees from the entrance angle), or some other range of angles plus or minus the angle of entrance. Similarly, angles from the average entrance point to the center of the intersection for each of the other possible entrances (e.g., via South State Street going South, via Packard Street going South-East, via Packard Street going North-West, via Arbor Street going West, etc.) may be determined in the same manner, and entrance ranges may be determined for each possible entrance, and an ordinal number may be used to identify each possible entrance. For instance, entering the intersection via South State Street, going North may assigned an ordinal of 1, entering the intersection via Packard Street going South-East may be assigned an ordinal of 2, entering the intersection via South State Street going South may be assigned an ordinal of 3, entering the intersection via Arbor Street going West may be assigned an ordinal of 4, and entering the intersection via Packard Street going North-West may be assigned an ordinal of 5.

Similarly, exit angles, and exit angle ranges, may be calculated for each possible exit from the intersection, and ordinals may be assign to each possible exit as with each possible entrance. In some examples, the ordinals assigned to each possible exit may correspond to the ordinals assigned to each possible entrance, in reverse. For instance, exiting the intersection via South State Street, going South may assigned an ordinal of 1, exiting the intersection via Packard Street going North-West may be assigned an ordinal of 2, exiting the intersection via South State Street going North may be assigned an ordinal of 3, exiting the intersection via Arbor Street going East may be assigned an ordinal of 4, and exiting the intersection via Packard Street going South-East may be assigned an ordinal of 5.

Accordingly, the vehicle's entrance angle may be compared to each of the entrance ranges and assigned an entrance ordinal, and the vehicle's exit angle may be compared to each of the exit ranges and assigned an exit ordinal. Based on the two ordinals, the turn made by the vehicle may be identified. For instance, a vehicle that makes a (1, 4) turn has turned from South State Street going North to Arbor Street going East, and a vehicle that makes a (5, 2) turn has turned from Packard Street going North-West to South State Street going North.

In some examples, once the direction associated with the vehicle's turn through the intersection during the vehicle trip is determined, the second simplified line representative of the portion of the vehicle trip through the intersection may be compared to a spatial average path of turns associated with the same direction through the intersection made during a plurality of other vehicle trips by a respective plurality of other vehicles. That is, the vehicle's turn through the intersection may be compared to an average of other turns through the same intersection in the same direction. For instance, if the vehicle made a North-Southeast turn through the intersection, the second simplified line representative of the vehicle's turn through the intersection may be compared to a line representative of the spatial average path of other vehicles that made a North-Southeast turn through the intersection.

Based on this comparison, in some examples, a measure of the difference between the second simplified line representative of the portion of the vehicle trip through the intersection and the spatial average path of turns associated with the same direction through the intersection made during the plurality of other vehicle trips by the respective plurality of other vehicles may be determined. That is, a measure of the difference between the vehicle's path during the intersection and the average path of other vehicles that made the same turn through the intersection may be calculated.

In some examples, calculating this measure of difference includes calculating a Hausdorff distance or a Fréchet distance between the two lines. Generally speaking, a Hausdorff distance, or Hausdorff metric, also called Pompeiu-Hausdorff distance, measures how far two subsets of a metric space are from each other, and a Fréchet distance is a measure of similarity between curves that takes into account the location and ordering of the points along the curves.

Moreover, in some examples, calculating this measure of difference includes dividing the simplified line representative of the portion of the vehicle trip through the intersection into a number of segments, and dividing the average simplified line into the same number of segments, and comparing each segment of each of the simplified line representative of the portion of the vehicle trip through the intersection to the corresponding segment of the spatial average through the turn of the intersection. For instance, the distance of each node of the simplified line representative of the portion of the vehicle trip through the intersection may be compared to the corresponding node of the average spatial path through the turn of the intersection, and minimum, maximum, and average distances between each of the nodes from the simplified line representative of the portion of the vehicle trip through the intersection and the corresponding node of the average spatial path through the turn of the intersection. Similarly, the angles (e.g., 0-360) of each segment of the simplified line representative of the portion of the vehicle trip through the intersection may be compared to the angle of the corresponding segment of the average spatial path through the intersection to determine a difference in angles, and minimum, maximum, and average differences in angles between each of the segments of the simplified line representative of the portion of the vehicle trip through the intersection and the corresponding segment of the average spatial path through the intersection may be determined Based on this measure of difference, it may be possible to determine an indication of any unsafe driving behaviors associated with the portion of the vehicle trip through the intersection. For instance, if the vehicle's path through the intersection varies in some ways from the average path of other vehicles that made the same turn through the intersection, this may indicate that the vehicle was driven through the intersection in an unsafe or otherwise manner.

Moreover, in some examples, based on this measure of difference, it may be possible to determine an indication that the vehicle likely did not actually make a turn through the intersection. For instance, if the vehicle's path through the intersection varies significantly from the average path of other vehicles that made the turns through the intersection, in some cases the vehicle's path through the intersection should not be categorized as a turn through the intersection. For example, the portion of the vehicle trip through the region of the intersection may be more properly categorized as a U-turn or as a parking lot turn.

Additionally, the techniques provided herein may also be used to derive road data from driving data on non-intersection road segments with the same start and end points, in some examples. On longer and more complex road shapes, the methods described herein would include additional segments, e.g., with each segment about 10 feet in length, and the total number of segments calculated as a proportion of the total length.

With the foregoing, an insurance customer may opt-in to a rewards, insurance discount, or other type of program. After the insurance customer provides their affirmative consent, an insurance provider remote server may collect data from the customer's mobile device or other smart devices-such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for determining a direction that a particular vehicle turned through an intersection without use of external road or map data, the computer-implemented method comprising:
   receiving, by a processor, via a network, telematics data captured by sensors associated with a vehicle trip;
   generating, by the processor, a first simplified line representative of the vehicle trip based on the telematics data associated with the vehicle trip;
   obtaining, by the processor, based on the telematics data associated with the vehicle trip, spatial data representative of a boundary of a region associated with a particular traffic intersection;
   identifying, by the processor, a first spatial data point on the first simplified line associated with an entrance of a vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection;
   comparing, by the processor, the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection;
   generating, by the processor, a second simplified line representative of a portion of the vehicle trip through the intersection based on the first time and the second time;
   segmenting, by the processor, the second simplified line into an entrance segment and an exit segment;
   measuring, by the processor, a first angle in a range of 0 to 360 degrees associated with the entrance segment, and a second angle in the range of 0 to 360 degrees associated with the exit segment; and
   determining, by the processor, a direction associated with a turn through the intersection during the vehicle trip based on the first angle and the second angle, without the use of external road or map data.

2. The computer-implemented method of claim 1, further comprising:
   comparing, by the processor, based on determining the direction associated with the turn through the intersection during the vehicle trip, the second simplified line representative of the portion of the vehicle trip through the intersection to a spatial average path of turns associated with a same direction through the intersection made during a plurality of other vehicle trips by a respective plurality of other vehicles.

3. The computer-implemented method of claim 2, further comprising:
   determining, by the processor, based on the comparing of the second simplified line to the spatial average path, a measure of a difference between the second simplified line representative of the portion of the vehicle trip through the intersection and the spatial average path of turns associated with the same direction through the intersection made during the plurality of other vehicle trips by the respective plurality of other vehicles.

4. The computer-implemented method of claim 3, wherein the measure of the difference is a measurement of a Hausdorff distance between the second simplified line representative of the portion of the vehicle trip through the intersection and the spatial average path of turns associated with the same direction through the intersection made during the plurality of other vehicle trips by the respective plurality of other vehicles.

5. The computer-implemented method of claim 3, further comprising:
   identifying, by the processor, based on the measure of the difference between the second simplified line representative of the portion of the vehicle trip through the intersection and the spatial average path of turns associated with the same direction through the intersection made during the plurality of other vehicle trips by the respective plurality of other vehicles, one or more unsafe driving behaviors associated with the portion of the vehicle trip through the intersection.

6. The computer-implemented method of claim 3, further comprising:
  determining, by the processor, based on the measure of the difference between the second simplified line representative of the portion of the vehicle trip through the intersection and the spatial average path of turns associated with the same direction through the intersection made during the plurality of other vehicle trips by the respective plurality of other vehicles, that the portion of the vehicle trip through the intersection should not be categorized as a turn through the intersection.

7. The computer-implemented method of claim 6, further comprising:
  categorizing, by the processor the portion of the vehicle trip through the intersection as a U-turn or as a parking lot turn.

8. A non-transitory computer-readable storage medium comprising instructions for determining a direction that a particular vehicle turned through an intersection without use of external road or map data that, when executed, cause a machine to:
  receive, via a network, telematics data captured by sensors associated with a vehicle trip;
  generate a first simplified line representative of the vehicle trip based on the telematics data associated with the vehicle trip;
  obtain, based on the telematics data associated with the vehicle trip, spatial data representative of a boundary of a region associated with a particular traffic intersection;
  identify a first spatial data point on the first simplified line associated with an entrance of a vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection;
  compare the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection;
  generate a second simplified line representative of a portion of the vehicle trip through the intersection based on the first time and the second time;
  segment the second simplified line into an entrance segment and an exit segment;
  measure a first angle in a range of 0 to 360 degrees associated with the entrance segment, and a second angle in the range of 0 to 360 degrees associated with the exit segment; and
  determine a direction associated with a turn through the intersection during the vehicle trip based on the first angle and the second angle, without the use of external road or map data.

9. The non-transitory computer-readable storage medium of claim 8, including further instructions that, when executed, cause the machine to:
  compare, based on determining the direction associated with the turn through the intersection during the vehicle trip, the second simplified line representative of the portion of the vehicle trip through the intersection to a spatial average path of turns associated with a same direction through the intersection made during a plurality of other vehicle trips by a respective plurality of other vehicles.

10. The non-transitory computer-readable storage medium of claim 9, including further instructions that, when executed, cause the machine to:
  determine, based on the comparing of the second simplified line to the spatial average path, a measure of a difference between the second simplified line representative of the portion of the vehicle trip through the intersection and the spatial average path of turns associated with the same direction through the intersection made during the plurality of other vehicle trips by the respective plurality of other vehicles.

11. The non-transitory computer-readable storage medium of claim 10, wherein the measure of the difference is a measurement of a Hausdorff distance between the second simplified line representative of the portion of the vehicle trip through the intersection and the spatial average path of turns associated with the same direction through the intersection made during the plurality of other vehicle trips by the respective plurality of other vehicles.

12. The non-transitory computer-readable storage medium of claim 10, including further instructions that, when executed, cause the machine to:
  identify, based on the measure of the difference between the second simplified line representative of the portion of the vehicle trip through the intersection and the spatial average path of turns associated with the same direction through the intersection made during the plurality of other vehicle trips by the respective plurality of other vehicles, one or more unsafe driving behaviors associated with the portion of the vehicle trip through the intersection.

13. The non-transitory computer-readable storage medium of claim 10, including further instructions that, when executed, cause the machine to:
  determine, based on the measure of the difference between the second simplified line representative of the portion of the vehicle trip through the intersection and the spatial average path of turns associated with the same direction through the intersection made during the plurality of other vehicle trips by the respective plurality of other vehicles, that the portion of the vehicle trip through the intersection should not be categorized as a turn through the intersection.

14. The non-transitory computer-readable storage medium of claim 13, including further instructions that, when executed, cause the machine to:
  categorize the portion of the vehicle trip through the intersection as a U-turn or as a parking lot turn.

15. A computing device, comprising a processor and a memory storing instructions for determining a direction that a particular vehicle turned through an intersection without use of external road or map data that, when executed by the processor, cause the processor to:
  receive, via a network, telematics data captured by sensors associated with a vehicle trip;
  generate a first simplified line representative of the vehicle trip based on the telematics data associated with the vehicle trip;
  obtain, based on the telematics data associated with the vehicle trip, spatial data representative of a boundary of a region associated with a particular traffic intersection;
  identify a first spatial data point on the first simplified line associated with an entrance of a vehicle into the region associated with the particular traffic intersection and a second spatial data point on the first simplified line associated with an exit of the vehicle from the region associated with the particular traffic intersection, based on intersections between the first simplified line representative of the vehicle trip and the boundary of the region associated with the particular traffic intersection;

compare the first spatial data point and the second spatial data point to the telematics data associated with the vehicle trip to determine a first time associated with the entrance of the vehicle into the region associated with the particular traffic intersection and a second time associated with the exit of the vehicle from the region associated with the particular traffic intersection;

generate a second simplified line representative of a portion of the vehicle trip through the intersection based on the first time and the second time;

segment the second simplified line into an entrance segment and an exit segment;

measure a first angle in a range of 0 to 360 degrees associated with the entrance segment, and a second angle in the range of 0 to 360 degrees associated with the exit segment; and determine a direction associated with a turn through the intersection during the vehicle trip based on the first angle and the second angle, without the use of external road or map data.

16. The computing device of claim 15, wherein the memory further includes instructions that, when executed, cause the processor to:

compare, based on determining the direction associated with the turn through the intersection during the vehicle trip, the second simplified line representative of the portion of the vehicle trip through the intersection to a spatial average path of turns associated with a same direction through the intersection made during a plurality of other vehicle trips by a respective plurality of other vehicles.

17. The computing device of claim 16, wherein the memory further includes instructions that, when executed, cause the processor to:

determine, based on the comparing of the second simplified line to the spatial average path, a measure of a difference between the second simplified line representative of the portion of the vehicle trip through the intersection and the spatial average path of turns associated with the same direction through the intersection made during the plurality of other vehicle trips by the respective plurality of other vehicles.

18. The computing device of claim 17, wherein the measure of the difference is a measurement of a Hausdorff distance between the second simplified line representative of the portion of the vehicle trip through the intersection and the spatial average path of turns associated with the same direction through the intersection made during the plurality of other vehicle trips by the respective plurality of other vehicles.

19. The computing device of claim 17, wherein the memory further includes instructions that, when executed, cause the processor to:

identify, based on the measure of the difference between the second simplified line representative of the portion of the vehicle trip through the intersection and the spatial average path of turns associated with the same direction through the intersection made during the plurality of other vehicle trips by the respective plurality of other vehicles, one or more unsafe driving behaviors associated with the portion of the vehicle trip through the intersection.

20. The computing device of claim 17, wherein the memory further includes instructions that, when executed, cause the processor to:

determine, based on the measure of the difference between the second simplified line representative of the portion of the vehicle trip through the intersection and the spatial average path of turns associated with the same direction through the intersection made during the plurality of other vehicle trips by the respective plurality of other vehicles, that the portion of the vehicle trip through the intersection should not be categorized as a turn through the intersection.

* * * * *